July 29, 1952
J. E. McDONALD
2,604,949
HELICOPTER CONTROL
Filed Oct. 4, 1945
3 Sheets-Sheet 1
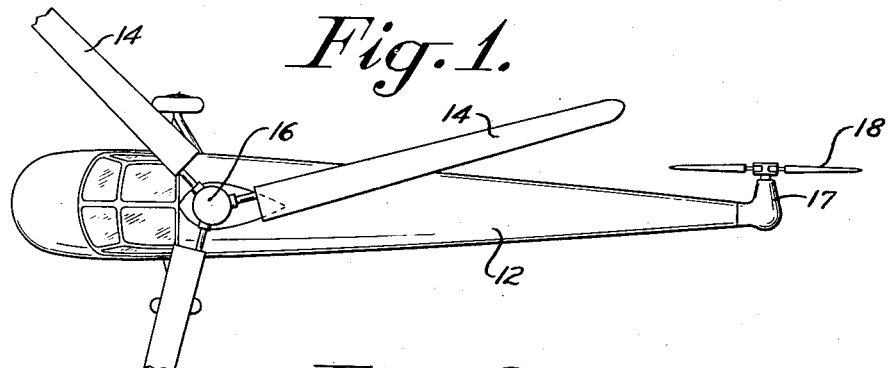
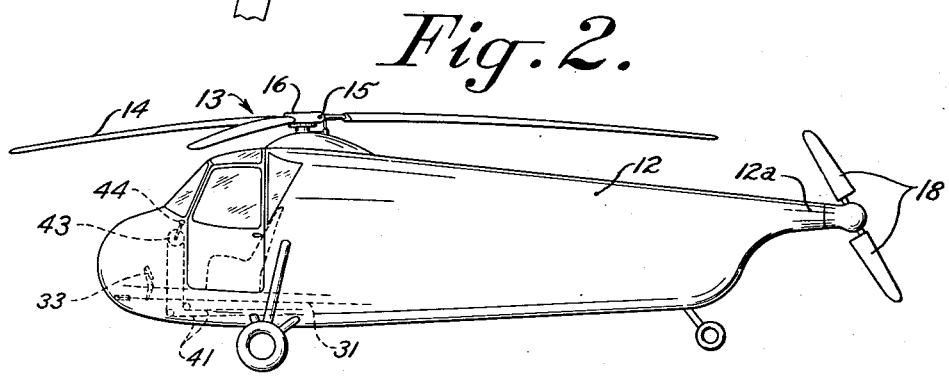
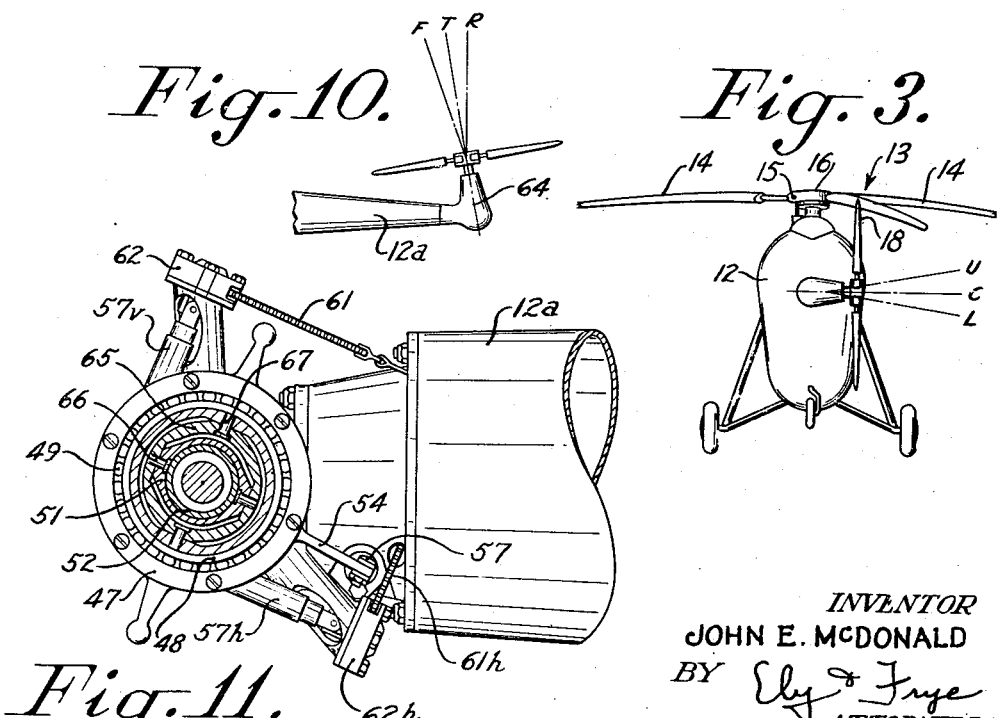
INVENTOR
JOHN E. McDONALD
BY Ely & Frye
ATTORNEYS

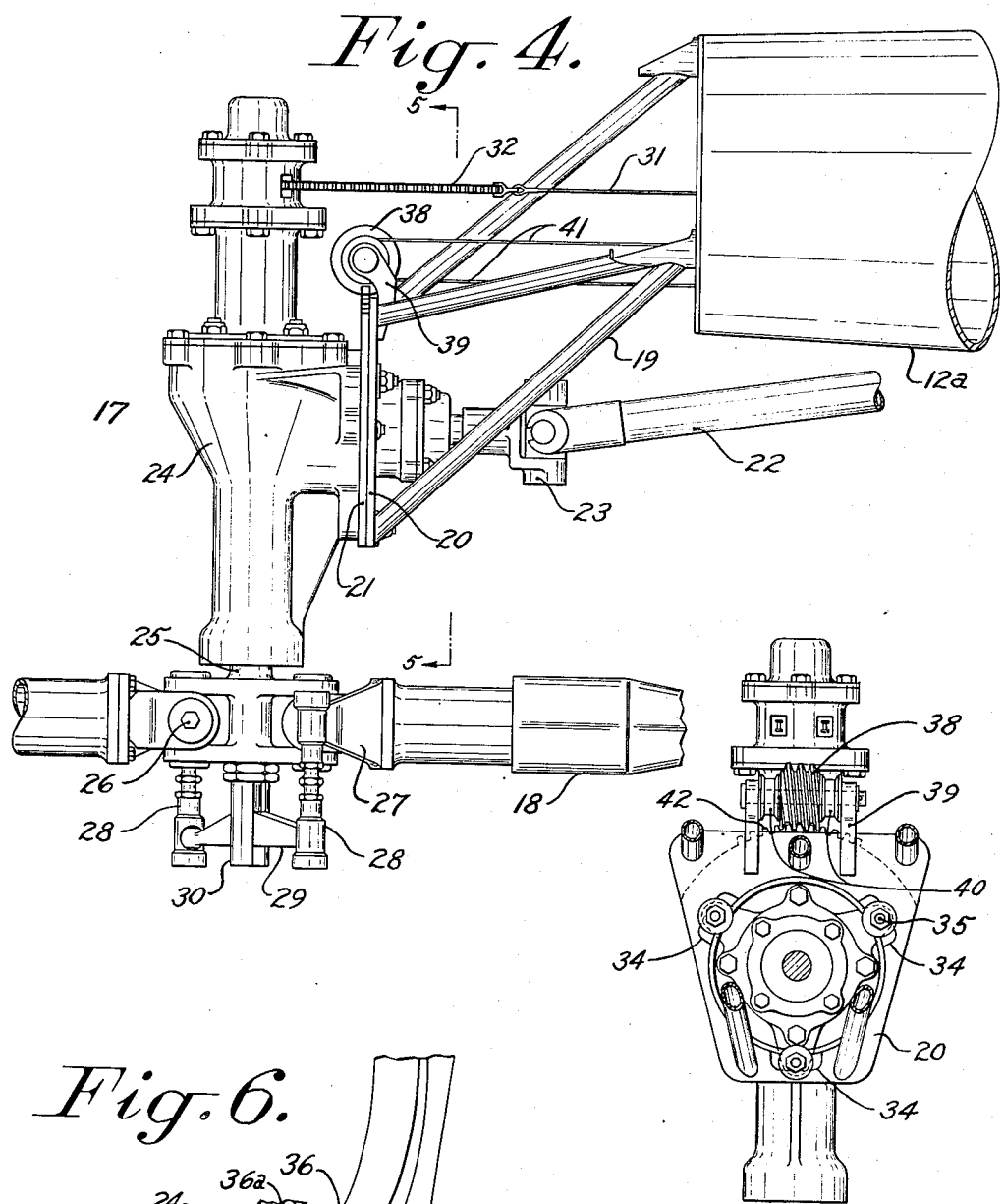
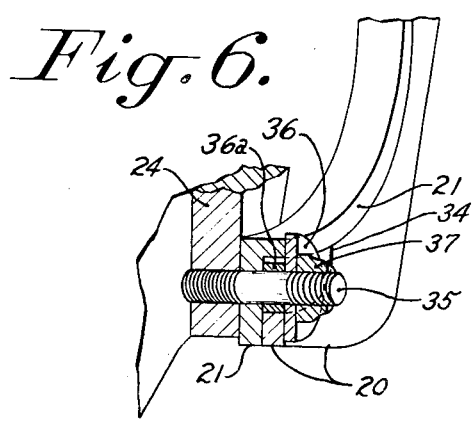

July 29, 1952 J. E. McDONALD 2,604,949
HELICOPTER CONTROL
Filed Oct. 4, 1945 3 Sheets-Sheet 3
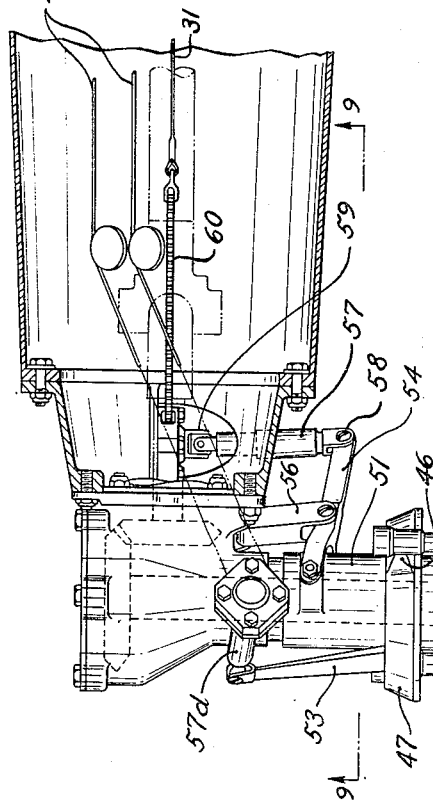
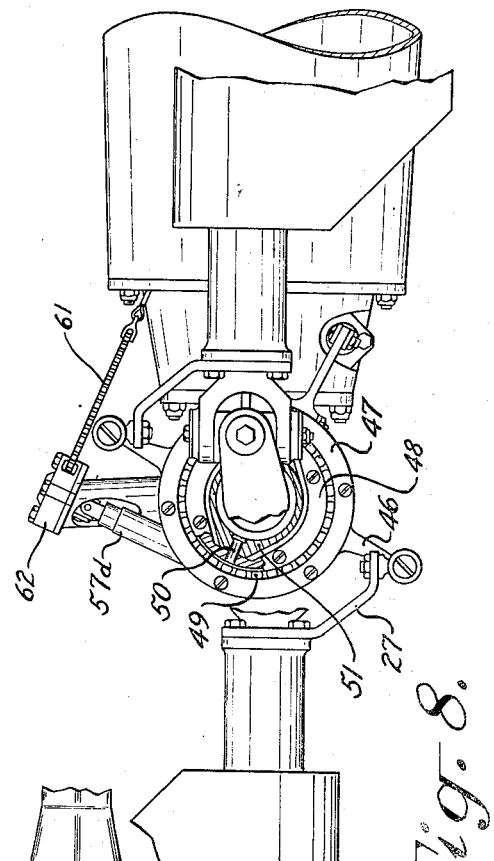
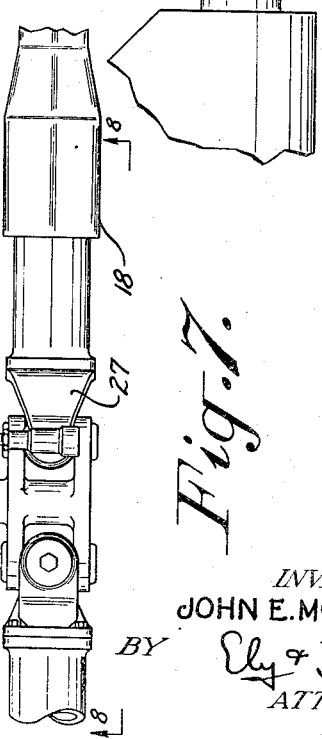
INVENTOR
JOHN E. McDONALD
BY Ely & Frye
ATTORNEYS Patented July 29, 1952

2,604,949

UNITED STATES PATENT OFFICE 2,604,949

HELICOPTER CONTROL

John E. McDonald, Hatboro, Pa., assignor, by mesne assignments, to The Firestone Tire & Rubber Company, Akron, Ohio, a corporation of Ohio Application October 4, 1945, Serial No. 620,244

1 Claim. (Cl. 170—135.22)

This invention relates to aircraft, and is particularly concerned with helicopter type machines having a torque correcting rotor longitudinally offset with respect to the axis of the main lifting rotor.

In aircraft of this nature, the attitude of the craft varies with respect to the horizontal, depending upon the loading condition which may change the longitudinal location of the center of gravity, and also depending upon the speed of advancement. In order to provide the thrust for forward flight, it is necessary to incline the rotor in a forward direction. This in turn causes an inclination of the fuselage, giving a nosedown attitude. Such an inclination of the fuselage is required to cause the resultant thrust vector of the rotor to pass close to the center of gravity of the aircraft under forward flight condition. In the absence of any external longitudinal moments other than the drag of the fuselage and rotor, which have but a small effect upon the resultant moments, such a nosedown fuselage attitude, during flight, is inevitable.

Further, in an aircraft of this nature, as the forward speed increases, it becomes necessary to move the control member further forward to maintain a neutral or stabilized attitude. The reason for this is that the transverse air flow over the rotor causes increased lift on the advancing blade, and decreased lift on the retreating blade. By moving the control stick to a more forwardly position, a reduction in the aerodynamic pitch of the advancing blade and an increase in the pitch of the retreating blade is produced to compensate for the variation in lift. At high forward speeds, the shift in neutral stick position may be of sufficiently great amplitude that most of the control range is used up in this manner, with the result that there is inadequate forward control movement remaining for longitudinal maneuvering purposes.

One of the primary advantages of the present invention is to provide means for increasing the effective control range of such an aircraft, without the need for increasing the physical control range. This is accomplished under the present invention by providing an external moment in the longitudinal plane, using the tail rotor as the medium for obtaining this moment. A further object of the invention is to provide means for adjustment of this longitudinal moment to permit improved stick positions at a variety of forward speeds.

Another object of the invention is to provide means for adjustment of the attitude of the fuselage, so that this may be controlled to some degree for the comfort of the occupants, particularly while operating under cruising conditions for a considerable period of time.

In a helicopter aircraft of the type to which the present invention is applicable, the torque correcting rotor is normally mounted with its thrust axis transverse to the longitudinal axis of the aircraft. At forward speeds, a cross flow is produced on the tail rotor, which normally produces a considerable drag component, thereby reducing the aerodynamic efficiency of the craft. It is an object of the present invention to provide means whereby this drag component may be counteracted by the tail rotor itself. This is accomplished by setting or adjusting the tail rotor on the aircraft with its thrust axis in a direction having a small angle to provide a forward component of thrust when the tail rotor is operating for drag-corrective purposes.

Provision of a forward component for the tail rotor thrust gives a further advantage, particularly in cases where the torque correcting rotor axis is located below the plane of rotation of the main rotor. With such a construction the drag of the torque rotor acts below the center of lift. This drag, therefore, adds to the normal drag of the fuselage to produce a nose-down attitude during forward flight. By decreasing or eliminating the drag effect of the tail rotor by a forward component of tail rotor thrust the attitude of the fuselage is improved during forward flight. This, in turn, results in a better direction of air flow over the fuselage, giving a further drag reduction. Thus the improvement resulting from the forward component of thrust of the tail rotor is greater than the direct reduction in drag of the tail rotor.

It is a further object of the invention to provide means for adjusting the degree of forward thrust for different forward operating speeds, so that the correct amount of compensating forward thrust may be provided to overcome the aerodynamic drag component of the tail rotor for any particular speed.

How the foregoing and other objects and advantages are attained will be evident from the following description of the drawings, in which—

Figure 1 is a plan view of an aircraft of the type to which the features of the present invention may be applied.

Figure 2 is a side-elevational view of the aircraft illustrated in Figure 1.

Figure 3 is a rear view of the aircraft shown in Figures 1 and 2.

Figure 4 is a plan view of the tail rotor mounting, showing details of construction.

Figure 5 is a view in the direction of the arrows 5—5, Figure 4, showing details for the adjustment of the tail rotor.

Figure 6 is a detail perspective view, illustrating the manner in which certain parts are assembled to obtain rotational adjustment.

Figure 7 is a plan view similar to Figure 4, illustrating an alternative form of adjusting mechanism.

Figure 8 is a view in the direction of the arrows 8—8, Figure 7, a portion of the structure being cut away to more clearly disclose the construction.

Figure 9 is a view taken in the direction of arrows 9—9, Figure 7, with certain parts in section to show control operating elements.

Figure 10 is a plan view of a portion of the rear end of an aircraft showing a rotor mounted with a forward inclination of the thrust axis.

Figure 11 illustrates a control system to be associated with a mounting according to that disclosed in Figure 10.

Referring to Figures 1, 2 and 3, there is shown an aircraft having a fuselage 12 and a sustaining rotor, generally indicated at 13, and having blades 14 attached by pivot 15 to the hub unit 16. This rotor is driven in conventional fashion by an engine, located in the fuselage, below the rotor. The torque developed by driving rotor 13 is counteracted by means of a small rotor unit 17, having blades 18 located at the rear end of the fuselage 12. The rotor 17 is mounted on the aircraft with its thrust axis generally transverse to the longitudinal axis of the aircraft, the extension 12a being proportioned to produce a minimum of aerodynamic interference. According to the present invention, the normal direction of thrust of the rotor may be adjusted from a directly transverse direction C as shown in Figure 3, to a small angle above and below the position C indicated as U and L in Figure 3.

A method of obtaining the adjustment in a vertical plane for the rotor 17 is illustrated in Figures 4, 5 and 6. In Figures 4 and 5 the rotor unit 17 is shown mounted on the fuselage extension 12a by means of a structure 19. A plate-like member 20 is attached to the rear portion of the structure 19 and a cooperating plate 21 which is attached to the rotor unit is supported on plate 20 in a fashion to allow rotational movement between the two plates, as will be described later. The tail rotor is driven by means of drive shaft 22, and universal joint 23 which apply the power to a pair of bevel gears contained in housing 24, and which, in turn, drive the shaft and hub 25 to which the blades 18 are attached. The blades 18 are attached to the hub by means of flapping pivots 26 and also are mounted for pitch variation, which pitch is controlled by the rudder pedals to provide an increase or decrease in the thrust of the tail rotor, thereby giving directional control to the aircraft.

The mechanism for the simultaneous pitch control of the blades incorporates an arm 27 attached to the root fitting of each blade, arm 27 being actuated by push-rod 28 having a ball joint at each end. Both push-rods 28 are attached to a transverse beam 29 which may be moved axially but is prevented by members 30 from rotational movement with respect to the hub. A push-rod connects beam 29 with the actuating mechanism, there being a rotating connection in the push rod and a worm thread mechanism for providing the axial movement. The worm thread is actuated by means of cables 31, attached to chain 32, which in turn operates a sprocket in which the male portion of the worm thread is supported. As previously mentioned, cables 31 are connected with the rudder pedals 33, as will be seen in Figure 2.

The adjustment in the vertical plane for the angle of the rotor thrust is accomplished by the rotational mounting of the rotor unit 17 on the plates 20 and 21. A detail of the mounting parts is shown in Figure 6, where it can be seen that the stationary ring 20 has slots 34 through which project studs 35 attached to the ring 21 and threaded into housing 24 (see also Figure 5). A suitable washer 36, spacer 36a and nut 37 are provided for attachment of the parts. With this construction, rotation of ring 21 with respect to ring 20 may occur, the limits being provided by the length of the slot 34.

Adjustment of the angle of thrust is made by means of the worm gear mechanism illustrated in Figures 4 and 5. Here it will be seen that the worm 38 is rotationally mounted in brackets 39, attached to the stationary ring 20. Drums 40, around which the adjusting cables 41 are passed, provide the means for rotation of the worm 38. The worm 38 meshes with gear teeth 42, which are cut in the outer periphery of the ring 21. Operation of cables 41, therefore, causes rotation of the hub 17, to permit adjustment to various positions between the limits U and L indicated in Figure 3.

Cables 41 run to the operator's compartment, and, as will be seen in Figure 2, these cables pass around drum 43. An operator's control, having handle 44, is attached to the drum, to provide means by which the operator makes the adjustment.

Figures 7, 8 and 9 illustrate an alternative form of mechanism for accomplishing the simultaneous pitch control of the rotor blades for changing the degree of thrust of the tail rotor, and also for changing the direction of thrust of the tail rotor in the transverse vertical plane. In this form of apparatus the direction of thrust is changed by differentially feathering the rotor blade pitch to obtain a resultant thrust vector at an angle to the horizontal. The rotor blades in the form illustrated in Figures 7, 8 and 9, are attached to the rotating axle portion of the hub, in a fashion generally similar to that illustrated in Figure 4, there being an arm 27 attached to the portion of the blade 18 mounted for pitch variation. Attached to the end of arms 27 are push-rods 45, which are located in substantial parallelism to the axis of the rotor. The opposite end of rod 45 is connected by means of a ball and socket joint to an arm 46, which is attached to a rotating outer ring 47. As will be most readily seen in Figure 8, the outer ring 47 is supported on a stationary inner ring 48, by means of anti-friction bearings 49. The inner ring 48 is pivotally supported by means of pivots 50, to a cylindrical sleeve 51, which surrounds the cylindrical hub housing 52. An arm 53 is attached to the non-rotating inner ring 48, and projects therefrom in a direction generally parallel to the rotational axis in a fashion which allows swinging of the arm 53 to cause movements of the inner ring 48 on pivots 50, thereby permitting a tilting motion of the ring assembly, including the outer ring 47 and the arms 46.

Differential pitch change is accomplished by means of the mechanism just described, in which tilting of the arms 46 produces an oscillating motion of the blades as they rotate, thereby permitting the tail rotor thrust to be adjusted (depending upon the setting of arm 53) to positions within the range indicated in Figure 3, the upper limit being shown at U, and the lower limit at L.

The simultaneous or collective pitch change for varying the amount of rotor thrust is accomplished through axial motion of the annular sleeve 51 on which the rings 47 and 48 are supported. This axial motion is controlled by means of a beam 54, which is pivotally attached to the sleeve 51, as indicated at 55. The beam 54 is connected to the hub by means of a link 56, and adjusting movement for pitch change is supplied through unit 57, which is pivotally connected to the beam 54, at 58. Unit 57 incorporates a fast-acting thread, and is connected to a rotating shaft member by means of universal joint 59. The rotating member which actuates unit 57 includes a sprocket over which chain 60 runs, which chain is moved by means of cables 31. As in the case of the previously described mechanism, cables 31 connect with the rubber pedals (see Figure 2).

The differential pitch control which actuates arm 53, includes somewhat similar mechanism to that just described for the collective pitch control. Thus, cables 41, which, as in the previous form of device, connect with drum 43 and handle 44 in the operator's compartment as indicated in Figure 2, operate chain 61. Chain 61 passes over the sprocket in the casing 62, and causes rotational movement of the shaft 63. This, in turn, rotates the fast-acting thread in unit 57d, thereby lengthening or shortening this unit, and causing adjustment of the position of arm 53.

Figures 10 and 11 illustrate the form of the invention in which the thrust vector may be directed angularly in the horizontal plane as well as in the vertical plane. Figure 10 illustrates a plan view of the tail rotor unit in which the tail rotor axis is mounted on the fuselage at a slight angle with respect to the transverse direction. This is indicated by axis or center line 64, which at its forward side makes a angle slightly less than 90° with respect to the longitudinal center line of the aircraft. With the tail rotor thrust T in normal or central position, it is directed in line with axis 64. Adjustment of the direction of thrust may be made to the forward position indicated by line F or to the rearward position indicated by line R, depending upon the speed of translation of the aircraft. At high forward speeds it will be most economical to adjust the thrust to the position indicated by the line F and for slow speeds adjustment to the rearward position R will be most effective.

Adjustment in this plane is accomplished by means of another control element in addition to the control for simultaneous pitch and the control for vertical adjustment, which were illustrated in Figures 7 to 9. As illustrated in Figure 11 the simultaneous pitch adjustment is controlled by parts similar to those described in connection with Figure 7, namely: screw-jack unit 57 and arm 54, which operate to move the sleeve 51 in an axial direction. In the form shown in Figure 11, the swash plate is mounted for tilting in all directions. This is accomplished by providing a gimbal ring 65 which is pivotally attached to the sleeve 51 by pivots 66. The outer portion of the swash member is, in turn, supported on the gimbal ring 65 by another pair of pivots 67, the axis of which is at 90° with respect to the axis of pivots 66. As in the case of the swash plate in Figure 8, the swash plate of Figure 11 has an outer rotatable ring 47, which is mounted on the inner non-rotatable ring 48 by bearings 49.

With the mounting of the swash plate as described above, tilting may be effected either about the axis of pivots 66 or of pivots 67, to provide adjustment of the angle of the swash plate within limits, in any direction. Adjustment in a tilting sense is accomplished by means of the chain 61 on sprocket unit 62, which operates the threaded adjusting rod 57v. This mechanism causes adjustment of the swash plate about the axis 66, and produces displacement of the rotor thrust vector angularly in the vertical plane. Adjustment of the swash plate about the axis 67 is accomplished through the medium of the threaded adjusting rod 57h, which is actuated by the sprocket unit 62h and chain 61h. Chain 61h is operated by a separate set of cables which run to an individual control in the pilot's compartment (not shown) which may be similar to the drum and crank illustrated at 43 and 44, in Figure 2.

It will be evident from the foregoing description of the mechanism disclosed in Figure 11 that control or adjustment of the direction of thrust of the tail rotor may be accurately varied by the pilot through the medium of the swash plate mechanism, which causes feathering of the rotor blades. The plane of feathering being universally adjustable permits any desired thrust vector adjustment to provide not only for trim of the aircraft at various speeds of advancement and to compensate for different loading conditions, but also to provide for improved aerodynamic efficiency by inclination of the trust in a horizontal plane.

By the use of an adjustable tail rotor device in accordance with the present invention it will be seen that improved balance conditions are obtained. This results in greater passenger comfort, improved operating conditions and increased efficiency. Part of the improvement in aerodynamic efficiency is obtained as a result of better fuselage attitude thereby reducing fuselage drag and resulting in increased power for propulsion purposes. A further important advantage is the improvement in control, particularly with respect to the reduced excursion of the neutral position of the control stick in forward flight.

I claim:

A helicopter having a fuselage structure, a main lifting and control rotor supported above said fuselage, a torque-counteracting rotor supported on said fuselage structure at a point longitudinally offset from said main rotor, said torque rotor having blades mounted for pitch change movements, a pair of pedal members, connections between said members and said blades for controlling the thrust of said torque rotor, a second auxiliary manual control located in the operator's compartment, and control connections from said control to said torque rotor to cause slight tilting movement thereof, said torque rotor being mounted for tilting about an axis substantially parallel to but offset from the longitudinal axis of the fuselage, the tilting mechanism comprising a plate member attached to the fuselage, a second plate member attached to the torque rotor, one of said plate members incorporating a plurality of slots, threaded stud elements attached to the other plate member and projecting through the slots, washers and retention nuts on said studs to support the plate members for relative rotational movement about said parallel axis within the limits of said slots.

JOHN E. McDONALD.

REFERENCES CITED

The following references are of record in the file of this patent:

UNITED STATES PATENTS

| Number | Name | Date |
|---|---|---|
| 1,794,202 | Pickard | Feb. 24, 1931 |
| 1,994,488 | Sikorsky | Mar. 19, 1935 |
| 2,130,918 | De Stefano | Sept. 20, 1938 |
| 2,378,617 | Burke | June 19, 1945 |
| 2,385,889 | Skavinsky | Oct. 2, 1945 |
| 2,394,513 | Chappedelaine | Feb. 5, 1946 |
| 2,433,641 | Young | Dec. 30, 1947 |
| 2,491,549 | Brewster | Dec. 20, 1949 |
| 2,496,624 | Heintze | Feb. 7, 1950 |

FOREIGN PATENTS

| Number | Country | Date |
|---|---|---|
| 880,360 | France | Dec. 28, 1942 |